June 23, 1942.   E. A. ROBERTSON   2,287,135
COUPLING MEANS
Filed Jan. 31, 1938
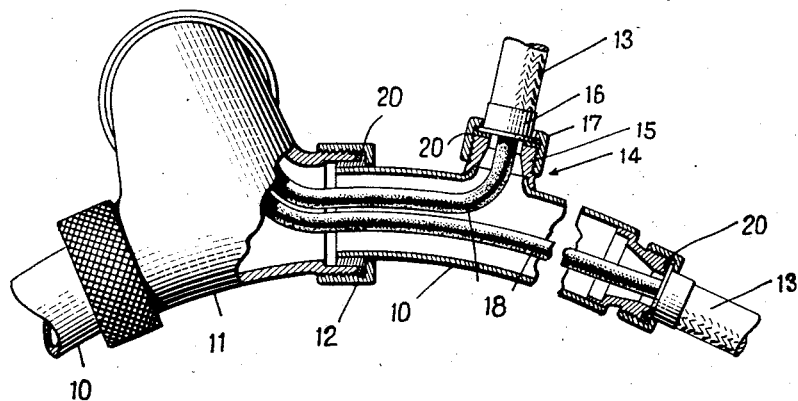
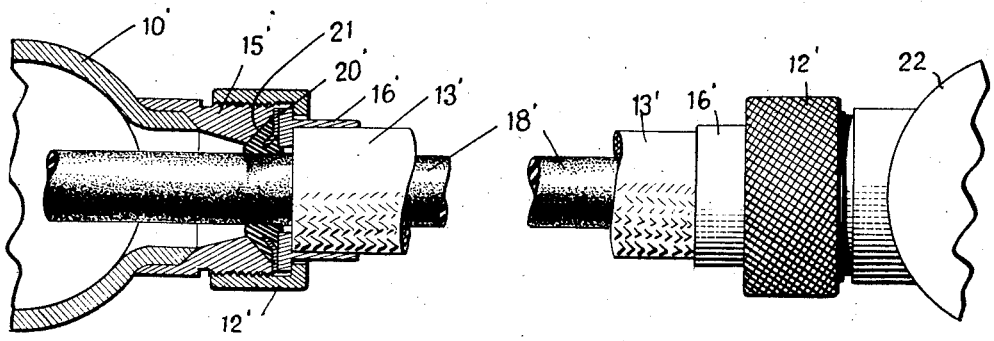
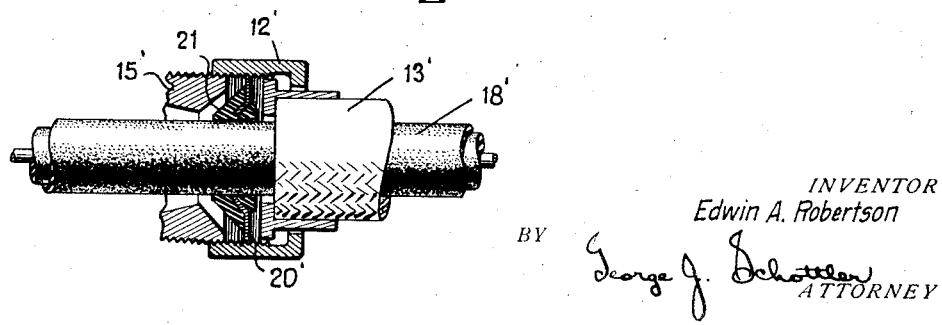
INVENTOR
Edwin A. Robertson
BY George J. Schottler
ATTORNEY Patented June 23, 1942

2,287,135

UNITED STATES PATENT OFFICE 2,287,135

COUPLING MEANS

Edwin A. Robertson, Sandusky, Ohio, assignor, by mesne assignments, to Bendix Aviation Corporation, South Bend, Ind., a corporation of Delaware Application January 31, 1938, Serial No. 187,779

13 Claims. (Cl. 174—35)

This invention relates to coupling means and more particularly to means for coupling radio-shielding conduits for electrical conductors and to gaskets adapted for use therein.

In a radio shielded ignition manifold which includes flexible or rigid conduits or tubes enclosing ignition wires, as shown in my prior application Serial No. 35,683, filed August 10, 1935, there are several problems which the present invention is intended to eliminate.

One problem is the establishment and maintenance of good electrical connections through the unions of the metallic shielding conduits. Previously it has been the practice to rely upon the union sleeve to maintain the electrical connection. This is unsatisfactory due to the collection of non-conducting material on the screw threads and shoulders of the interfitting parts. This material may be dirt and oil from the hands of mechanics or from the motor. Even if an imperfect connection exists only along part of the periphery of the union, the results are objectionable because the current from the point of good connection must flow circumferentially thus setting up a separate field and causing radio interference.

The present invention eliminates this problem by the provision of a metal gasket directly between adjacent conduit elements, thus assuring a good electrical connection independently of the union sleeve.

Another problem, particularly in shielding for aircraft engine ignition, is the exclusion of moisture from the interior of the shielding conduits. One cause of moisture entering the conduits is the action of the propeller. The conduits are so mounted on the engine as to be partly or wholly in the slip stream so that when flying at speed through rain the forces tending to drive water into the conduits are enormous.

Another cause of moisture entering the conduits is the "breathing" action due to the expansion and expulsion of air when the conduit is hot during operation of the motor and the contraction and intake of air when the conduit is cold. Moisture drawn in with the air tends to condense and since the cycle is continually being repeated it is possible for enough moisture to be present inside the conduits to seriously impair, if not stop, the operation of the engine if this moisture should reach the spark plugs or magnetos which are shielded in common with the connecting cables.

It has been proven that practically all the moisture which gains access to the conduits enters at the unions. The present invention eliminates the second-mentioned problem by providing a resilient gasket which thoroughly seals the conduits at the union.

Another problem is the creepage of water along the ignition cables within the conduits. If this water reaches the ignition devices, particularly the spark plugs, it is likely to cause the ignition current to spark over to ground thus dissipating part, or all, of this current and preventing proper functioning at the spark plug gaps. The flow of water to the spark plugs is especially likely to occur at the inverted cylinders of a radial engine but eventually would reach all cylinders.

The present invention eliminates this third-mentioned problem by the provision of the resilient gaskets mentioned above. The gaskets are so proportioned in relation to the size of the ignition cables and the parts of the union that they are pressed firmly about the cables so as to completely prevent the creepage of water past the gaskets. Since one of these gaskets is provided immediately adjacent each of the spark plugs where the shielded conduit joins the shield of the spark plug, there will be no possibility of water from the conduit reaching the plugs. The gaskets at other unions will stop the travel of water along the cables at these points.

Gaskets of resilient material adapted to be squeezed between conduit unions and ignition cables have previously been known, but for at least two reasons have proved unsatisfactory. First, they were interposed between the entire ends of the conduit sections so as to completely insulate the sections from each other except through the connecting sleeve; and second, in tightening the union the resilient gasket material was squeezed too deeply into the insulating covering of the ignition cable, there being nothing except the resilient gasket between the union sections to definitely limit their movement toward each other, and as a consequence a permanent neck was formed in the cable insulation causing failures. Moreover, the sleeves were screwed up so tight in making a secure connection that the resilient gasket was over-compressed and soon hardened and became useless for its intended purpose.

Other objects and features of novelty will be apparent to those skilled in the art from the following description of certain illustrative embodiments of the invention and the accompanying drawing thereof, wherein:

Fig. 1 is a side elevation partly in section, illustrating one form of the invention wherein a gasket of metal alone is employed;

Fig. 2 is a side elevation, partly in section, illustrating another form of the invention wherein a gasket of metal and resilient material is employed; and Fig. 3 is a section showing a coupling like that of Fig. 2 before it is tightened together.

Referring to Fig. 1, there is shown enough of the ignition manifold which is described in my co-pending application to furnish an understanding of the intended environment of the present invention. The manifold includes trunk sections 10 preferably of rigid conduit, trunk couplings 11 including trunk unions 12, branch sections 13 preferably of flexible conduit, and unions 14 for the branch conduits where they connect with the trunk conduit and also at the spark plug shields. Conductors or ignition cables 18 insulated as by rubber or the like are disposed in the conduits.

The unions comprise a threaded member 15, a flanged ferrule 16 and a flanged interiorly threaded sleeve 17.

In the form shown in Fig. 1 the gasket comprises only a metallic washer 20 of good conducting material such as copper or lead. This is placed between the abutting ends of the union members 15 and 16 and, when the sleeve 17 is tightened, serves to establish a good electrical connection through the union independently of the sleeve. Where a soft metal is used it will also serve to seal the union against the entry of moisture. The metal washer may be used at all the unions, whether in the trunk conduits or branch conduits.

In Figs. 2 and 3 the parts which are common to these figures and to Fig. 1 are indicated by the same reference numbers with a prime (') added. In Fig. 2 there is shown a spark plug shield 22 with a union thereat. In the second and preferred form of the invention the gasket comprises a metallic washer 20' having good conductivity, such as copper or brass, and a body or grommet 21 of resilient material such as rubber integrally secured thereto. The washer 20' is cupped at the center to enter and be integrally embedded in the body of resilient material. The washer may also be slightly cupped at the outer edge to assist in establishing a good electrical connection. The union member 15' is formed with a conical recess or seat in its end to receive the similarly shaped body of resilient material 21 of the gasket.

The interior of the gasket composed of resilient material is provided with an aperture which closely but not tightly fits about the exterior surface of the insulated ignition cable 18'. This permits the gasket to be freely threaded on the cable. The aperture of the grommet is tapered or conical and is smallest at the outer end farthest from the washer. The conical portion of the resilient body of the gasket, as shown in Fig. 3, is made slightly larger than the conical recess in the end of the union member 15' so that when the union is tightened, as shown in Fig. 2, the resilient material is tightly squeezed about the outer surface of the ignition cable. The conical portion of the resilient material of the gasket, however, is made only slightly larger than the conical recess in the union member so that the gasket material is not squeezed so far into the insulation of the ignition cable as to cause a permanent deformation or neck to be formed therein.

The end of the union member 15' outside the conical recess or gasket seat is provided with a flat annular surface opposed to the flat surface on the end of the companion union member 16'. The parts are so proportioned that when the union is tightened the outer rim of the metallic washer 20' will be positioned between the opposed flat surfaces of the union and the union may be "made up" as tightly as necessary without producing any injury to the gasket. Only metal portions and none of the resilient portions of the gasket are interposed between the opposed flat ends of the union members which take the final pressure of connection.

The body of resilient material of the gasket is also exposed on the side of the washer opposite the conical portion and the flat end surface of the union member 16' extends inward toward the ignition cable far enough to engage the resilient material and compress it when the union is fully made up. Thus a seal with resilient material is produced on each side of the metal washer and there will be no possibility of moisture entering at the union.

It will thus be seen that the invention provides a union including a gasket of simple form which will dependably establish electrical connection through the union independently of the union sleeve; which will effectively prevent the entry of moisture; which will positively prevent the longitudinal flow of water inside the conduit past the union; and which will avoid necking the insulation of the ignition cables.

Inasmuch as excellent results have been obtained in actual installations with gaskets of certain proportions and dimensions it may be helpful to the successful practice of the invention to give an actual example; but it is to be understood that this is given by way of example only and is not intended to impose any limitations or restrictions on the invention in its broader aspects.

For an insulated ignition cable having an outside diameter (O. D.) of 0.290" with tolerance variations of plus .000" and minus .010", the gasket may have an inside diameter (I. D.) at the small end of the internally tapered opening of 0.260" with tolerance of plus .002" and minus .000". This small cylindrical diameter may extend axially for approximately $\frac{1}{32}$" from the small end of the gasket. Beyond this, the interior opening may expand at an angle of approximately 17° with the central axis, the total spread on both sides of the axis thus being approximately 34°. The over-all length of the gasket may be $1\frac{13}{64}$" with tolerances of plus or minus .005". The rubber at the large end of the gasket may extend approximately $\frac{1}{32}$" beyond the metal washer and may have an outside diameter of approximately $\frac{7}{8}$". This projecting annular lip of rubber may be rounded, for example on a radius of approximately $\frac{1}{32}$". The outside diameter of the rubber at the washer may be 0.551" with tolerances of plus .000" and minus .002" with a taper of approximately 35° on each side of the axis, the total spread on both sides of the axis thus being approximately 70°. The outside diameter of the metal washer may be $\frac{5}{8}$" with tolerances of plus .000" and minus .002". The thickness of the metal washer may be $\frac{1}{32}$" or less but, of course, a greater thickness may be employed if the type of metal used or other considerations should make this desirable, in which case the gasket might be lengthened correspondingly.

The term "rubber" will be understood to include any of the rubber-like or elastic plastic compounds, whether of natural or artificial rubber or mixtures of two or more such compounds. The type selected may depend upon heat-resistance, oil-resistance, aging, wear resistance or other factors well recognized in the rubber art.

Gaskets of the specified type and dimensions have been used on cables of the specified dimension for long periods of time without causing any appreciable permanent necking of the conductor insulation. The joint nevertheless is tightly maintained along the cable and against the space outside the manifold. Neither the gaskets nor the conductor insulations appear to lose their resilience or power to assume their original size and shape after being dis-assembled for a short time, even though the joint has been kept tight in service for a long period of time.

While certain embodiments of the invention have been described in detail in order to furnish a proper understanding of its application, it is to be remembered that the invention may be variously embodied within the scope of the subjoined claims.

I claim:

1. In a union such as for coupling the conduit sections of radio shielding for an electrical conductor, the combination of an electrical conductor, companion union members, one of said members being provided with an interior end recess and both of said members being provided with exterior opposed faces, means for coupling said union members together, a rigid, pressure-resisting metal washer having a solid portion thereof disposed between and engaging said opposed exterior faces, and a rubber grommet disposed in said recess between and in engagement with said members and squeezed inwardly about said conductor.

2. In a union, such as for coupling the conduit sections of radio shielding for an electrical conductor, the combination of a conduit union member provided at its end with an interiorly disposed conical seat and an exteriorly disposed annular face, a companion conduit union member provided at its end with an annular face opposed to the annular face and conical seat of said first-mentioned member, a sleeve for connecting said members, and a gasket including an externally exposed metal washer and an internal body of resilient material integrally united to the inner portion of the washer, the resilient material being exposed on each side of the washer so as to be engaged by said conical seat of the first-mentioned member and by the face of the second-mentioned member, and said washer being engaged between the outer faces of said members.

3. In a union, such as for coupling the conduit sections of radio shielding of an electrical conductor, the combination of an insulated cable, a conduit union member provided at its end with an interiorly disposed conical seat and an exteriorly disposed annular face, a companion conduit union member provided at its end with an annular face opposed to the annular face and conical seat of said first-mentioned member, a sleeve for connecting said members, and a gasket including an externally exposed metal washer and an internal body of resilient material integrally united to the inner portion of the washer, the resilient material being exposed on each side of the washer so as to be engaged by said conical seat of the first-mentioned member and by the face of the second-mentioned member, and said washer being engaged between the outer faces of said members, said body of resilient material on one side of the metal washer being larger but only slightly larger than the conical seat and the interior aperture of said gasket being initially of a size to fit closely about the outer surface of said insulated cable, and said resilient material being only slightly exposed on the other side of said metal washer, whereby when the outer portion of the metal washer is tightly clamped between the outer faces of said members the body of resilient material is engaged by both members to form a seal to exclude moisture from the conduit, and the resilient material is squeezed inward about said cable to form a seal therewith to prevent the travel of liquid along the conduit past said union but not tightly enough to form a deep neck in the insulation of said cable.

4. In a union, such as for coupling the conduit sections of radio shielding for an electrical conductor, the combination of a conduit union member provided at its end with an interiorly disposed conical seat and an exteriorly disposed annular face, a companion conduit union member provided at its end with an annular face opposed to the annular face and conical seat of said first-mentioned member, a sleeve for connecting said members, and a gasket including an externally exposed metal washer and an internal body of resilient material integrally united to the inner portion of the washer, the resilient material being exposed on each side of the washer so as to be engaged by said conical seat of the first-mentioned member and by the face of the second-mentioned member, and said washer being engaged between the outer faces of said members, said metal washer being cupped at its inner portion to extend into the body of resilient material.

5. In apparatus of the class described, the combination of a plurality of conduit sections, an insulated cable in said conduits, and a union for said conduit sections comprising companion end members, a connecting sleeve, and a unitary gasket including a solid metal washer clamped between and engaging the outer portions of the end members and a body of resilient material engaging and squeezed between the inner portions of said end members and about the outer surface of the insulation on said cable.

6. A gasket comprising a metal washer having a flat, rigid, pressure-resisting portion exposed exteriorly and an inner grommet of resilient insulating material secured to the inner portion of the washer, said washer being cupped interiorly within said grommet of resilient material.

7. A gasket comprising a metal washer having a flat, rigid, pressure-resisting portion exposed exteriorly and an inner grommet of resilient insulating material secured to the inner portion of the washer, said grommet of resilient material being exposed beyond both faces of said washer.

8. A gasket comprising a metal washer having a flat, rigid, pressure-resisting portion exposed exteriorly and an inner grommet of resilient insulating material secured to the inner portion of the washer, said washer being cupped within said grommet and said grommet being formed with an enlarged conical portion on the side on which the inner edge of the washer extends.

9. A device as set forth in claim 8 in which the interior hole in said grommet is tapered conically and is smallest at the portion distant from the washer.

10. In apparatus for coupling the conduit sections of shielding for an insulated conductor, the combination with mating conduit end members and connecting means to draw the end members together of a gasket including a resilient ring disposed between and in contact with said end members and wedged closely but not tightly around said conductor insulation when said end members are drawn into final position toward each other to establish tight and secure electrical and mechanical connection therebetween, said end members having facing parts exteriorly of said resilient ring, and said gasket including a rigid, pressure-resisting metal element clamped tightly between and in direct contact with the facing parts of said end members when drawn together.

11. A gasket comprising a metallic washer having a central opening and a body of yieldable insulating material having a central opening smaller than an concentric with the opening in said washer, said body being secured to and extending axially beyond said washer in both directions and the inner and outer diameters of said washer being smaller and larger, respectively, than the maximum outer diameter of said body.

12. A gasket having a central opening and comprising a metallic washer and a body of yieldable insulating material, said washer having an inner portion embedded in said body intermediate the ends of the latter and an outer portion extending radially beyond the periphery of said body for a substantial distance.

13. A gasket having a central opening and comprising a metallic element having an external flat radially extending portion and an internal portion extending axially at an angle to said external portion, and a body of yieldable insulating material, said internal portion being embedded in said body and said body extending axially in both directions beyond said element, the major portion of said body being on one side of the external flat portion of said element and having an external cone-like surface.

EDWIN A. ROBERTSON.